Patented Feb. 5, 1935

1,989,683

UNITED STATES PATENT OFFICE 1,989,683

FLEXIBLE COATING COMPOSITION

Ralph T. K. Cornwell, Fredericksburg, Va., assignor to Sylvania Industrial Corporation, New York, N. Y., a corporation of Virginia No Drawing. Application May 19, 1933,
Serial No. 671,902

19 Claims. (Cl. 134—79)

This invention relates to coating compositions and to plasticizers therefor, and has as a general object the provision of novel and improved coating compositions.

A specific object of the invention is to provide a lacquer or coating composition comprising a lacquer base and a plasticizing component comprising a ketone acid of the benzophenone series or a substitution product thereof.

Another object of the invention is to incorporate with lacquers, and like coating compositions, a ketone acid of the benzophenone series or a substitution product thereof and preferably also an organic nitrogen base whereby novel and important properties are imparted to compositions and to films or coatings formed therefrom.

A further specific object of the invention is to provide a lacquer or coating composition comprising a lacquer base, wax and a ketone acid of the benzophenone series or a substitution product thereof which is adapted to form moistureproof, non-greasy, non-tacky and odorless coatings, sheets, films and the like which are characterized by being hard and non-tacky at ordinary temperature and readily heat-sealable at elevated temperatures in practical use.

Other objects of the invention will in part be obvious and will in part appear hereinafter.

The invention accordingly comprises novel products possessing the characteristics, properties and the relation of constituents, all as exemplified in the following detailed disclosure and the scope of the application of which will be indicated in the claims.

Heretofore in the manufacture of lacquers for flexible sheet materials, for example cellophane, the amount of plasticizer which could be added has been limited by the tackiness produced. This is due largely to the fact that substantially all heretofore known plasticizers are liquids or solids of low melting points.

In the manufacture of moistureproofing lacquers containing wax, the moistureproofness can be materially increased by the use of the presently contemplated plasticizers without the use of gum and with the production of improved flexible, moistureproof, transparent, odorless, non-greasy and non-tacky products which are readily heat-sealable.

The ketone acids of the benzophenone series, serving as novel plasticizing components of the present invention, are characterized by having relatively high melting points, e. g. above 100° C. This property, among others, permits the use of larger amounts of plasticizer in the production of non-tacky coatings, films and the like, and particularly when my novel plasticizers are used in properly proportioned mixtures with certain known plasticizers the total amount may comprise as high as 60% of the solid components of the lacquer without tackiness. This permits the production of highly moistureproof coatings and films containing wax and which are readily heat-sealable in adition to having the other desirable characteristics above mentioned. Oils, resins and the like may also be used if desired for certain purposes.

In carrying out the invention, I employ a composition comprising generally a compatible mixture of a lacquer base, and a plasticizing composition comprising a ketone acid of the benzophenone series, or more specifically, the gamma ketone acid or its substitution products, such as, for example, para-chlorobenzoyl-orthobenzoic acid, or its homologues such as toluyl benzoic acid, all of which acids have the following probable general formula:

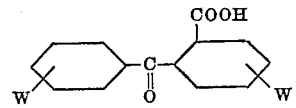

in which W represents a hydrogen or halogen atom, or an alkyl or aryl group. When larger amounts of plasticizer are desirable, the above compounds may be used in admixture with other plasticizers such as described hereinafter. I have found that the use of the relatively large amount of a plasticizing composition comprising a ketone acid of the benzophenone series or their substitution products with or without an additional plasticizer enables me to incorporate in a moistureproofing composition sufficient wax to give rise to a coating or film which is, at ordinary temperature, highly moistureproof, transparent, odorless, non-tacky and non-greasy and which is readily heat-sealable at temperatures of from about 135° to 170° C.

I have also found that preferred lacquers and coating compositions of improved and novel properties are obtained when such ketone acid is employed therein in conjunction with an organic nitrogen base, preferably of the aromatic series. The nitrogen base used is preferably one which has plasticizing properties and is substantially odorless, colorless and compatible with the several ingredients of the lacquer or coating composition. In general, it is preferable to employ the nitrogen base in an amount of from 4–5% less than the molecular proportion theoretically required for neutralizing the quantity of ketone acid contained in the composition.

Suitable organic nitrogen bases for use in the plasticizing mixture include acetanilide and its substitution products such as nitroacetanilide and amino acetanilide; the phenylene diamines; and urea and its substitution products such as diphenyl diethyl urea and diphenyl dimethyl urea. Where transparency is not essential or the composition is colored, one may employ diphenyl amine or urea derivatives, such as guanidine or its derivatives such as diphenyl guanidine.

The use of the organic nitrogen base, as herein described, has the advantage, among others, of preventing the ketone acid used from "blooming" or crystallizing out of the drying lacquer or coating composition. The ketone acid and the nitrogen base may combine to form a salt soluble in the lacquer coating ingredients, but if they do the combination is in all probability loose and I wish the invention to be construed as including the use both of the free ketone acid and free nitrogen base as well as of any compound which may result from their interaction.

In general, the lacquer ingredients may be employed broadly within the approximate limits as follows, the percentages being by weight:

|  | Per cent |
| --- | --- |
| Lacquer base | 30 to 70 |
| Plasticizer | |
|   Ketone acid of the benzophenone series | 5 to 20 |
|   Organic nitrogen base | 4 to 16 |
|   Additional plasticizer | 5 to 25 | to which may be added, if desired, one or more of the following:

|  | Per cent |
| --- | --- |
| Wax | 0.75 to 5 |
| Blown oil | Up to 5 |
| Gum or resin | Up to 60 |

The lacquer base comprises preferably nitrocellulose; however, it may comprise any suitable cellulose derivative, such as cellulose esters, cellulose ethers or the like, and/or any suitable lacquer base resin, as is well known to the art to which this invention appertains.

Suitable additional plasticizers for use with the ketone acids of the benzophenone series are, for example, para-toluol-sulphonamide-methylene resin, di-butyl phthalate, tri-phenyl phosphate or tri-cresyl phosphate. The additional plasticizer is chosen in particular with regard to its melting point. With ketone acids of relatively high melting point, one may use an additional plasticizer of lower melting point than would be permissible with a ketone acid of lower melting point. For most purposes, such additional plasticizers as may be used should be preferably substantially odorless and colorless. In all cases, they must be such as will dissolve the ketone acid.

The total amount of the mixture of ketone acid of the benzophenone series and of additional plasticizer may be varied to give the desired flexibility without resulting in a tacky product and in general for moistureproof coatings or films containing wax and no gum or the like, the total amount of the plasticizing mixture should not be substantially less than about 25%. For a readily heat-sealable, as well as non-tacky, composition the plasticizing mixture should comprise from about 25% to 40% and preferably about 35% by weight of the total solids used in the composition, of which composition the ketone acid should comprise not substantially less than 10% by weight. If the heat sealing property is not essential, the total amount of the plasticizing mixture may be reduced somewhat from the amounts given.

For the moistureproofing constituent any suitable animal, mineral or vegetable wax may be used, but I prefer to use a paraffin wax having a high melting point. The amount of wax may be so proportioned as to give the desired moistureproof value without greasiness. For readily heat-sealable as well as moistureproof coatings or films, the amount of wax should be preferably from about 0.75 to 3.5% by weight of the total solids.

If desired, a blown oil, such, for example, as blown rapeseed oil, may be used in the composition of this invention in accordance with my copending application, Serial No. 615,477, filed June 4, 1932.

As distinguished from the lacquer base resins, there may also be employed in the compositions of this invention, suitable natural gums or resins such, for example, as dammar. For the production of really heat-sealable compositions, the amount of such natural gums or resins should not substantially exceed about 5% by weight.

The invention will be explained in connection with the following tables of specific examples which are merely representative illustrations and which are in no sense intended to limit the invention to the exact details therein set forth. In the examples, all ingredients are expressed in percentages by weight.

There are given in the following table improved compositions which may be taken up in suitable solvent mixtures and used as lacquers or coating compositions for wood, leather, paper, fabrics, etc.

| Examples | 1 | 2 | 3 |
| --- | --- | --- | --- |
| Nitrocellulose, 4 sec | 63 | 62 | 60 |
| Ester gum | | 11 | 5 |
| O-benzoyl benzoic acid | 15 | 17 | 20 |
| Di-butyl phthalate | 16 | 10 | 15 |
| Acetanilide | 6 | | |

There are given in the following table improved compositions which are adapted to form coatings, films, sheets, etc., characterized by being highly moistureproof, transparent, flexible, non-greasy and non-tacky as well as readily heat-sealable at temperatures of from about 135° to 170° C.

| Examples | 4 | 5 | 6 | 7 | 8 |
| --- | --- | --- | --- | --- | --- |
| Nitrocellulose, 4 sec | 62 | 63.1 | 63 | 59 | 60 |
| O-benzoyl-benzoic acid | 15 | 14 | 15 | 10 | 14 |
| Toluyl benzoic acid | | | | 10 | |
| Di-butyl phthalate | 14 | 10 | | 5 | 6 |
| Tri-phenyl phosphate | | 5 | 15 | 10 | 10 |
| Acetanilide | 7 | 6 | | | 6 |
| Blown rapeseed oil | 0.5 | | 4.5 | 3.5 | 2.5 |
| Paraffin | 1.5 | 0.9 | 2.5 | 2.5 | 1.5 |
| Ozokerite | | 0.5 | | | |
| Spermaceti | | 0.5 | | | |

A lacquer may be prepared by taking up about 10 parts of one of the above compositions in about 150 parts of a suitable solvent such as, for example, one consisting of 15% ethyl acetate, 15% butyl acetate and 70% toluene. This may then be applied as a coating and dried in a heated dryer in the usual way, or formed into sheets or films, etc., if desired. The solvent is so selected as to maintain all the ingredients including the nitrogen base in complete solution until the composition has dried.

These novel compositions may be used in a number of arts, but are particularly advantageous for moistureproofing wrapping materials such as regenerated cellulose, cellulose esters and ethers, gelatine, casein, as well as glassine and the like, on account of the fact that they are transparent, non-greasy, non-tacky, odorless, give a high degree of moistureproofness and are readily heat-sealable at elevated temperatures in practical use. These novel compositions are further characterized by showing strong adherence to the wrapping materials above named.

I have found that if a film or sheet of cellophane, having a thickness of about one-thousandth of an inch, be coated, preferably on each side, with a moistureproofing composition approximately 1.5 ten thousandths of an inch thick, prepared in accordance with the present invention, the resistance of the coated sheet to the diffusion of water vapor is at least 50 times as great as that of the uncoated sheet of cellophane when both are tested comparatively at a temperature of 40° C. The term "moistureproof" as used herein is intended to cover a composition having such a moistureproofing value when so tested.

It will thus be seen that by means of the present invention there have been provided novel moistureproofing compositions having improved and technically important properties which may be economically and easily prepared and used, and since certain changes may be made in the above mentioned products and different embodiments of the invention could be made without departing from the scope thereof, it is intended that all matter contained in the above description shall be interpreted as illustrative and not in a limited sense. It is also to be understood that in said claims ingredients recited in the singular are intended to include compatible mixtures of such ingredients wherever the sense permits.

Having described my invention, what I claim as new and desire to secure by Letters Patent, is:

1. A composition for preparing flexible, and non-tacky coatings or films, comprising a compatible mixture of a lacquer base and a ketone acid having the following probable general formula:

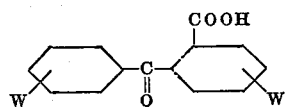

in which W represents a hydrogen or halogen atom or an alkyl or aryl group.

2. A composition for preparing flexible, and non-tacky coatings or films, comprising a compatible mixture of a lacquer base and a plasticizing mixture, said mixture comprising a ketone acid having the following probable general formula:

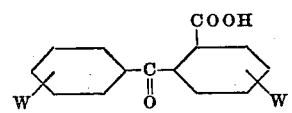

in which W represents a hydrogen or halogen atom or an alkyl or aryl group and an additional plasticizer in which said ketone acid is soluble.

3. A composition for preparing flexible, transparent, and non-tacky coatings or films, comprising a compatible mixture of a cellulose derivative, an aromatic nitrogen base and a ketone acid having the following probable general formula:

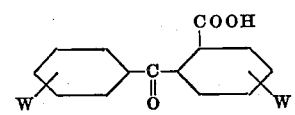

in which W represents a hydrogen or halogen atom or an alkyl or aryl group.

4. A composition for preparing flexible, transparent, and non-tacky coatings or films, comprising a compatible mixture of nitrocellulose and a ketone acid having the following probable general formula:

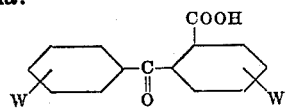

in which W represents a hydrogen or halogen atom or an alkyl or aryl group, and an aromatic nitrogen base in an amount slightly less than the molecular equivalent of said acid.

5. A composition for preparing flexible, transparent, and non-tacky coatings or films, comprising a compatible mixture of from about 30% to 70% of a lacquer base and up to about 20% of a ketone acid having the following probable general formula:

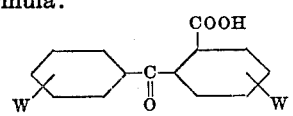

in which W represents a hydrogen or halogen atom or an alkyl or aryl group.

6. A composition for preparing moistureproof, flexible, thansparent and non-tacky coatings or films, comprising a compatible mixture of a lacquer base, wax and a ketone acid having the following probable general formula:

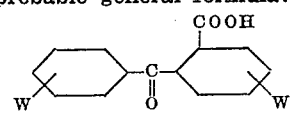

in which W represents a hydrogen or halogen atom or an alkyl or aryl group.

7. A composition for preparing moistureproof, flexible, transparent and non-tacky coatings or films, comprising a compatible mixture of a lacquer base, wax and a plasticizing mixture, said mixture comprising a ketone acid having the following probable general formula:

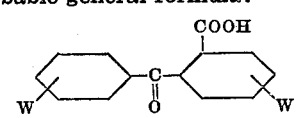

in which W represents a hydrogen or halogen atom or an alkyl or aryl group and an additional plasticizer in which said ketone acid is soluble.

8. A composition for preparing moistureproof, flexible, transparent and non-tacky coatings or films, comprising a compatible mixture of a cellulose derivative, wax, a ketone acid having the following probable general formula:

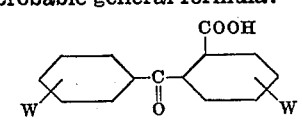

in which W represents a hydrogen or halogen atom or an alkyl or aryl group and an aromatic nitrogen base.

9. A composition for preparing moistureproof, flexible, transparent and non-tacky coatings or films, comprising a compatible mixture of nitrocellulose, wax, a ketone acid having the following probable general formula:

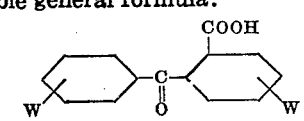

in which W represents a hydrogen or halogen atom or an alkyl or aryl group and an aromatic nitrogen base in an amount slightly less than the molecular equivalent of said acid.

10. A composition for preparing moistureproof, flexible, transparent and non-tacky coatings or films, comprising a compatible mixture of from about 30% to 70% of a lacquer base, of from about 2% to 6% of a wax, of from about 5% to 20% of a ketone acid having the following probable general formula:

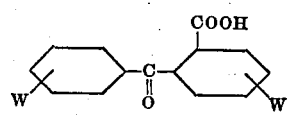

in which W represents a hydrogen or halogen atom or an alkyl or aryl group, of from about 5% to 25% of a plasticizer in which the ketone acid is soluble, and of from about 4% to 16% of an aromatic nitrogen base.

11. A composition for preparing moistureproof, flexible, transparent, non-tacky and readily heat-sealable coatings or films, comprising a compatible mixture of a lacquer base, a wax and not substantially less than about 10% of a ketone acid having the following probable general formula:

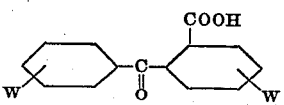

in which W represents a hydrogen or halogen atom or an alkyl or aryl group.

12. A composition for preparing moistureproof, flexible, transparent, non-tacky and readily heat-sealable coatings or films, comprising a compatible mixture of a lacquer base, a wax and from 10% to 20% of a ketone acid having the following probable general formula:

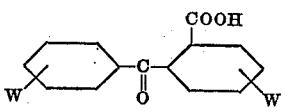

in which W represents a hydrogen or halogen atom or an alkyl or aryl group.

13. A composition for preparing moistureproof, flexible, transparent, non-tacky and readily heat-sealable coatings or films, comprising a compatible mixture of a lacquer base, a wax and not substantially less than about 25% of a plasticizing mixture comprising a ketone acid having the following probable general formula:

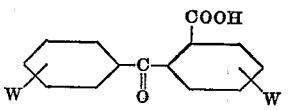

in which W represents a hydrogen or halogen atom or an alkyl or aryl group and an aromatic nitrogen base.

14. A composition for preparing moistureproof, flexible, transparent, non-tacky and readily heat-sealable coatings or films, comprising a compatible mixture of a lacquer base, a wax, from about 25% to 40% of a plasticizing mixture, said mixture comprising a ketone acid having the following probable general formula:

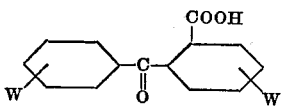

in which W represents a hydrogen or halogen atom or an alkyl or aryl group, an additional plasticizer in which said ketone acid is soluble and an aromatic nitrogen base in an amount slightly less than the molecular equivalent of said acid.

15. A composition for preparing moistureproof, flexible, transparent, non-tacky and readily heat-sealable coatings or films, comprising a compatible mixture of a lacquer base, a wax, a gum from about 25% to 40% of a plasticizing mixture, said mixture comprising a ketone acid having the following probable general formula:

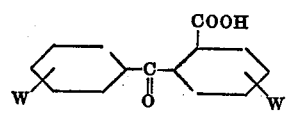

in which W represents a hydrogen or halogen atom or an alkyl or aryl group, an additional plasticizer in which said ketone acid is soluble and an aromatic nitrogen base in an amount slightly less than the molecular equivalent of said acid.

16. In a composition for preparing flexible, transparent and non-tacky coatings or films, a plasticizer comprising a ketone acid having the following probable general formula:

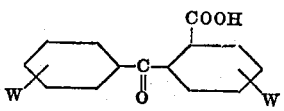

in which W represents a hydrogen or halogen atom or an alkyl or aryl group.

17. In a wax-containing composition for preparing moistureproof, flexible, transparent and non-tacky coatings or films, a plasticizer comprising a compatible mixture of a ketone acid having the following probable general formula:

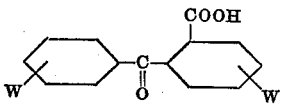

in which W represents a hydrogen or halogen atom or an alkyl or aryl group and an aromatic nitrogen base.

18. In a wax-containing composition for preparing moistureproof, flexible, non-tacky and readily heat-plastic coatings or films, a plasticizer comprising a ketone acid having the following probable general formula:

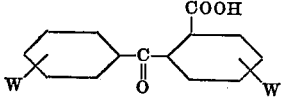

in which W represents a hydrogen or halogen atom or an alkyl or aryl group and an aromatic nitrogen base in an amount slightly less than the molecular equivalent of said acid.

19. In a wax-containing composition for preparing moistureproof, flexible, non-tacky and readily heat-sealable coatings or films, a plasticizing composition comprising a compatible mixture of a ketone acid having the following probable general formula:

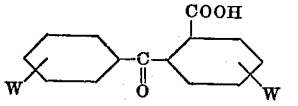

in which W represents a hydrogen or halogen atom or an alkyl or aryl group, an additional plasticizer in which said ketone acid is soluble and acetanilide in an amount slightly less than the molecular equivalent of said ketone acid.

RALPH T. K. CORNWELL.